US008875835B2

(12) United States Patent
Fujinori et al.

(10) Patent No.: US 8,875,835 B2
(45) Date of Patent: Nov. 4, 2014

(54) VEHICULAR REAR WHEEL STEERING DEVICE

(75) Inventors: Yoichi Fujinori, Miyoshi (JP); Hiromitsu Kageyama, Toyota (JP); Hajime Tanaka, Toyota (JP); Kenji Hayashi, Nagoya (JP); Koichi Nishimura, Nisshin (JP); Kenjiro Nagata, Okazaki (JP); Naoki Yamaguchi, Anjo (JP); Akiya Taneda, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 163 days.

(21) Appl. No.: 13/369,167

(22) Filed: Feb. 8, 2012

(65) Prior Publication Data
US 2012/0199413 A1 Aug. 9, 2012

(30) Foreign Application Priority Data
Feb. 8, 2011 (JP) .................. 2011-024626

(51) Int. Cl.
B62D 5/04 (2006.01)
B62D 3/06 (2006.01)
B62D 7/15 (2006.01)
B62D 3/12 (2006.01)

(52) U.S. Cl.
CPC ............... *B62D 3/12* (2013.01); *B62D 7/1581* (2013.01); *B62D 3/06* (2013.01); *B62D 5/0427* (2013.01)
USPC .......................................... 180/445; 180/444

(58) Field of Classification Search
USPC .................................. 180/444–446
See application file for complete search history.

(56) References Cited

U.S. PATENT DOCUMENTS 4,063,490 A * 12/1977 Duffy ............................. 91/467
5,590,732 A * 1/1997 Sugino et al. ................. 180/444

(Continued)

FOREIGN PATENT DOCUMENTS

CN 1680736 A 10/2005
EP 0 890 499 A1 1/1999

(Continued)

OTHER PUBLICATIONS

Extended European Search Report dated Dec. 12, 2012, issued by European Patent Office in corresponding European Patent Application No. 12154107.2-1264 (6 pages).

(Continued)

*Primary Examiner* — Anne Marie Boehler
*Assistant Examiner* — Maurice Williams
(74) *Attorney, Agent, or Firm* — Buchanan Ingersoll & Rooney PC

(57) ABSTRACT

A vehicular rear wheel steering device includes a housing, a rod being non-turnable with respect to the housing and movably supported in an axial direction of the rod, and a conversion mechanism arranged between the rod and the housing to convert a rotation of a rotational drive device to a drive force in the axial direction. The housing includes a tubular first bush disposed at a first end and a tubular second bush at a second end. Each bush is slidably engaged to an outer periphery of the rod and supports the rod to be movable in the axial direction. A rod supporting rigidity of the first bush is lower compared to that of the second bush. The first bush is arranged with an elastic body that deforms in a radial direction of the rod. The second bush is arranged with an inner periphery protrusion at which the rod tilts.

8 Claims, 2 Drawing Sheets

(56) References Cited

U.S. PATENT DOCUMENTS

| | | | |
|---|---|---|---|
| 5,694,810 A * | 12/1997 | Iwasa et al. | 74/422 |
| 6,041,886 A | 3/2000 | Nakaishi et al. | |
| 6,808,042 B2 * | 10/2004 | Namgung | 180/444 |
| 7,367,421 B2 * | 5/2008 | Saito et al. | 180/426 |
| 7,905,317 B2 * | 3/2011 | Kruttschnitt et al. | 180/444 |
| 2002/0195294 A1 * | 12/2002 | Taneda et al. | 180/445 |
| 2003/0006086 A1 * | 1/2003 | Ballester | 180/400 |
| 2003/0006088 A1 * | 1/2003 | Parker | 180/446 |
| 2003/0178244 A1 | 9/2003 | Namgung | |
| 2006/0076180 A1 * | 4/2006 | Saito et al. | 180/428 |
| 2007/0114093 A1 * | 5/2007 | Osuka et al. | 180/444 |
| 2007/0249453 A1 * | 10/2007 | Sugitani | 475/4 |
| 2009/0265885 A1 * | 10/2009 | Robertson et al. | 16/2.1 |
| 2010/0236860 A1 * | 9/2010 | Hoersh et al. | 180/444 |

FOREIGN PATENT DOCUMENTS

| | | |
|---|---|---|
| EP | 1 344 709 A1 | 9/2003 |
| JP | 2009-113730 A | 5/2009 |

OTHER PUBLICATIONS

Chinese Notification of the First Office Action dated May 6, 2014 issued in the corresponding Chinese Patent Application No. 201210023984.6 and English language translation (17 pages).

* cited by examiner

VEHICULAR REAR WHEEL STEERING DEVICE

CROSS REFERENCE TO RELATED APPLICATIONS

This application is based on and claims priority under 35 U.S.C. §119 to Japanese Patent Application 2011-024626, filed on Feb. 8, 2011, the entire content of which is incorporated herein by references.

TECHNICAL FIELD

This disclosure generally relates to a vehicular rear wheel steering device.

BACKGROUND DISCUSSION

A type of vehicular rear wheel steering device is disclosed in JP2009-113730A (hereinafter referred to as Patent reference 1). In the vehicular rear wheel steering device disclosed in the Patent reference 1, a first end of a rod is non-turnable with respect to a housing and movably supported in an axial direction at a spline structure of a conversion mechanism, which includes spline protrusions formed on the rod and spline grooves formed on the housing, while a second end of the rod is non-turnable with respect to a housing and movably supported in an axial direction via a predetermined clearance in a radial direction of the rod.

In the vehicular rear wheel steering device disclosed in the Patent reference 1, in addition to the predetermined clearance defined in a radial direction of the rod between the second end of the rod and the housing, another clearance is defined in the radial direction of the rod between the first end and the housing, the clearance that is defined between a spline protrusion and a spline groove. As a result, when the rod moves in the radial direction of the rod with respect to the housing, an abnormal noise may be generated. Removing the aforementioned clearances may prevent a generation of the abnormal noise. In such a case, an operation of the spline structure may be limited and, in addition, the wearing of sliding portions at the ends of the rod between the housing may increase.

A need thus exists for a vehicle seat device, which is not susceptible to the drawback mentioned above.

SUMMARY

In light of the foregoing, the disclosure provides a vehicular rear wheel steering device that includes a housing configured to be installed on a vehicle body, a rod being non-turnable with respect to the housing and movably supported in an axial direction of the rod, with each of opposite ends of the rod connected to a rear wheel of a vehicle, a conversion mechanism arranged between the rod and the housing to convert a rotational drive force of a rotational drive device to a drive force in the axial direction of the rod, a first bush in tubular form disposed at a first end of the housing, and a second bush in tubular form disposed at a second end of the housing. The first bush and the second bush are slidably engaged to an outer periphery of the rod and supports the rod in a state to be movable in the axial direction of the rod. A rod supporting rigidity of the first bush is determined to be lower compared to the rod supporting rigidity of the second bush. The first bush is arranged with an elastic body being resilient and being configured to change shape in a radial direction of the rod, and the second bush is arranged with an inner periphery protrusion at which the rod is configured to make a tilting movement.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
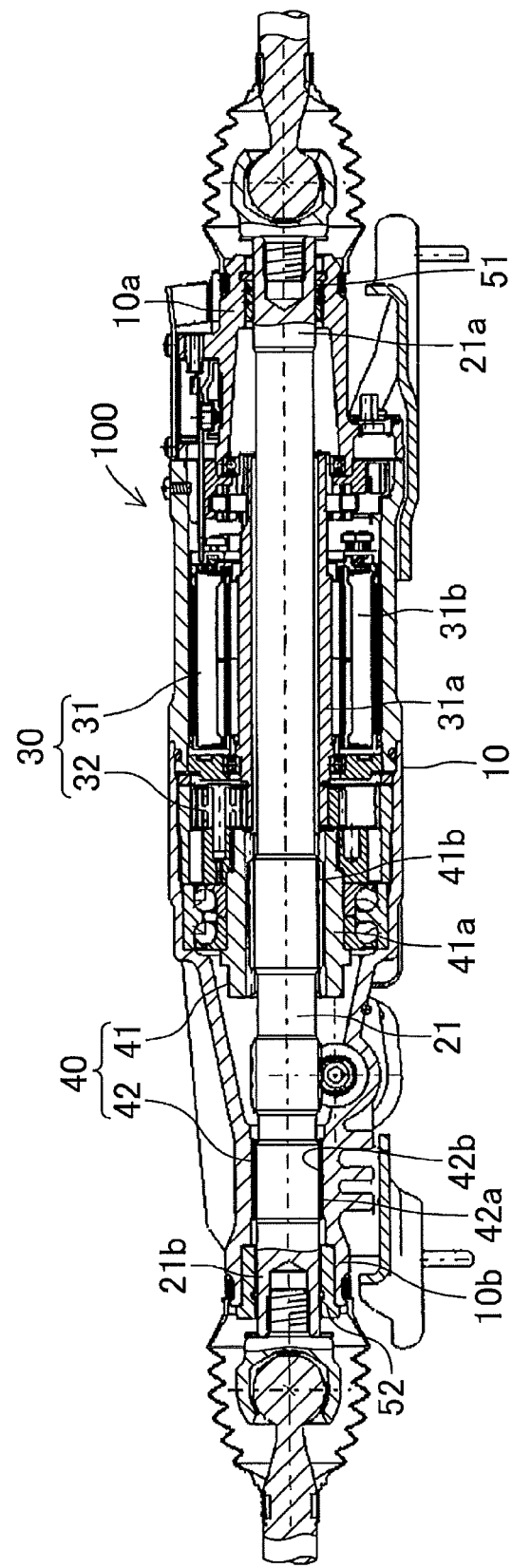
FIG. 1 is a vertically cut cross-section of a first embodiment of a vehicular rear wheel steering device disclosed here viewed from a front.

A vehicular rear wheel steering device disclosed here according to an embodiment will be described with references to FIGS. 1 to 3, which illustrate the embodiment of the vehicular rear wheel steering device disclosed here. Unless otherwise specified, right and left sides in this detailed description describes right and left sides in FIGS. 1 to 3, respectively, and axial direction indicates an axial direction of a rod 21. As FIG. 1 illustrates, a rear wheel steering device 100 according to the embodiment includes, a housing 10 configured to be installed on a vehicle body, the rod 21 being non-turnable with respect to the housing 10 and movably supported in the axial direction, with each of opposite ends 21a, 21b of the rod 21 connected to a corresponding rear wheel in left and right sides of a vehicle, a conversion mechanism 40 arranged between the rod 21 and the housing 10 to convert a rotational drive force of a rotational drive device 30 to a drive force in the axial direction of the rod 21.

The rotational drive device 30 includes a rotor 31a arranged within the housing 10 at an outer periphery of the rod 21 being coaxial to the rod 21 and rotational with respect to the rod 21, an electric motor 31 assembled within the housing 10 having a stator 31b that drives the rotor 31a to rotate, and a planetary gear reducer 32 arranged within the housing 10 being coaxial to the electric motor 31 and reducing a rotation of the rotor 31a. The electric motor 31 is controlled and driven with a widely known method by an electric control device.

The conversion mechanism 40 includes a screw structure 41, which is arranged in a middle portion of the rod 21, and a spline structure 42, which is arranged leftward of the screw structure 41 in FIG. 1. A screw portion of the screw structure 41 is configured with trapezoidal threads. The screw structure 41 includes a female thread 41a (a nut thread), and a male thread 41b. The female thread 41a (the nut thread), which is installed in a rotational state with respect to the housing 10 and immovable in the axial direction, is rotationally driven by the rotational drive device 30. The male thread 41b, which is formed on the rod 21, is screwed to the female thread 41a (the nut thread). The spline structure 42 includes spline protrusions 42a, which are formed on the rod 21, and spline grooves 42b, which are formed on the housing 10.

Figure 2:
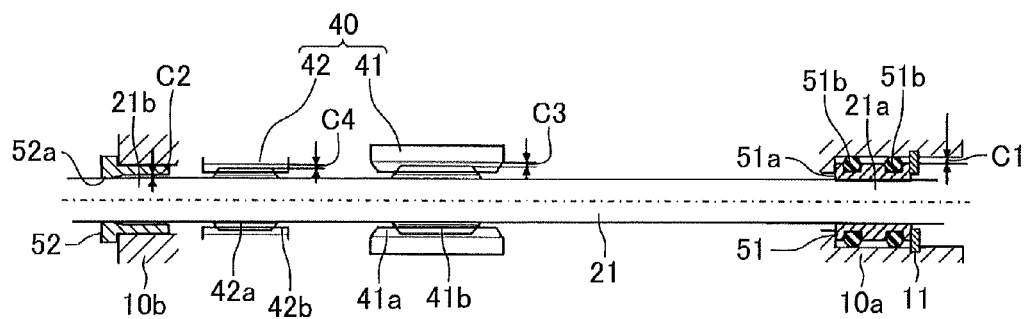
FIG. 2 is a simplified and enlarged schematic view of the vehicular rear wheel steering device showing substantial parts, for example, a housing, a rod, a screw structure, a spline structure, bushes.
Figure 3:
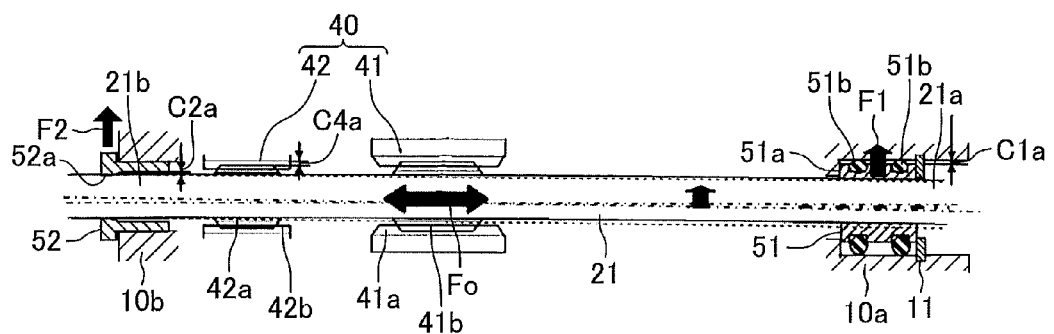
FIG. 3 is a schematic view describing operations of the substantial parts illustrated in FIG. 2.

In the embodiment as illustrated in FIGS. 1 to 3, a right bush 51 (serving as a first bush), disposed to the right in FIGS. 1 to 3, is in a tubular form and is disposed at a right end 10a (serving as a first end) of the housing 10, disposed to the right in FIGS. 1 to 3, and a left bush 52 (serving as a second bush), disposed to the left in FIGS. 1 to 3, is in tubular form and is disposed at a left end 10b (serving as a second end) of the housing 10, disposed to the left in FIGS. 1 to 3. The right bush 51 (the first bush) and the left bush 52 (the second bush) are slidably engaged to an outer periphery of the rod 21 and supports the rod 21 in a state to be movable in the axial direction. A rod supporting rigidity (i.e. a rigidity perpendicular to the axial direction) of the right bush 51 (the first bush) is defined to be lower compared to the rod supporting rigidity of the left bush 52 (the second bush). In the embodiment, the spline structure 42 is arranged near to the left bush 52 (the second bush) in a position between the screw structure 41 and the left bush 52 (the second bush).

As FIGS. 2 and 3 illustrate, the right bush 51 (the first bush) includes a bush body 51a having the entire length in axial direction slidably engaged to the outer periphery of the rod 21 and defined with a limited clearance between the rod 21 in a radial direction of the rod 21. A pair of elastic bodies 51b made of rubber are arranged in an outer periphery of the bush body 51a. The elastic bodies 51b are being resilient and configured to deform, that is to change shape, in the radial direction of the rod to a required amount for each between the housing 10. The right bush 51 (the first bush) is restrained from sliding off from a defined position with a clip 11 attached to the right end 10a (the first end) of the housing 10. Between the bush body 51a and the housing 10, a predetermined first clearance C1 in the radial direction of the rod 21 is defined when the rear wheel steering device 100 is inactive, as in a state illustrated in FIG. 2.

As FIGS. 2 and 3 illustrate, the left bush 52 (the second bush), with a level difference formed on an inner periphery and an outer periphery, is fitted to and retained at the left end 10b (the second end) with a limited clearance defined between the housing 10 in the radial direction of the rod. An inner periphery protrusion 52a in an annular form is formed on a left end of the inner periphery of the left bush 52 (the second bush). At the inner periphery protrusion 52a, the rod 21 is movably supported in the axial direction and is supported so that the rod 21 is configured to make a tilting movement. Between a rightward end portion of the left bush 52 (the second bush) and the rod 21, a predetermined second clearance C2 in the radial direction of the rod 21 is defined with a smaller clearance at the predetermined second clearance C2 in the radial direction of the rod 21 compared to the predetermined first clearance C1 (i.e. C2<C1) in the radial direction of the rod 21, when the device in this embodiment is inactive.

In the embodiment disclosed here, when the device in this embodiment is inactive, a third clearance C3 in the radial direction of the rod 21 is defined between the female thread 41a (the nut thread) and the male thread 41b. The third clearance C3, having an amount disproportionate in the radial direction, is defined due, for example, to an assembly variation for a manufacturing consideration and is defined in consideration of an operability of the screw structure 41. When the device in this embodiment is inactive, a fourth clearance C4 in the radial direction of the rod 21 is also defined between the spline protrusions 42a of the spline structure 42 and the spline grooves 42b. The fourth clearance C4, having an amount disproportionate in the radial direction, is defined due, for example, to an assembly variation for a manufacturing consideration and is defined in consideration of operability of the spline structure 42.

In the embodiment disclosed here, a distance in the axial direction (a separation distance) from a center of the screw structure 41 in the axial direction to the center of the right bush 51 (the first bush) in the axial direction is defined to be longer compared to the distance in the axial direction (another separation distance) from the center of the screw structure 41 in the axial direction to the inner periphery protrusion 52a of the left bush 52 (the second bush). The rod supporting rigidity (the rigidity perpendicular to the axial direction) of the right bush 51 (the first bush), which is on a side with a longer separation distance from the screw structure 41, is defined to be lower compared to the rod supporting rigidity of the left bush 52 (the second bush), which is on a side with a shorter separation distance from the screw structure 41.

In the embodiment with the configuration disclosed here, as FIG. 3 illustrates, when the electric motor 31 is driven and the rod 21 moves in the axial direction by receiving a thrust Fo, an axis aligning force is generated at the screw structure 41 (to the female thread 41a) to move the rod 21 in a direction in which the axis is off the alignment, which is illustrated as in an upward direction in FIG. 3. As a result, in FIG. 3, the rod 21 tilts to the upward direction in FIG. 3 at the portion in which the rod 21 engages to the left bush 52 (the second bush) as a fulcrum, which is at the inner periphery projection 52a, which in turn reduces the predetermined first clearance C1 in the radial direction of the rod 21, the predetermined second clearance C2 in the radial direction of the rod 21, and the fourth clearance C4 in the radial direction of the rod 21 to a reduced first clearance C1a in the radial direction of the rod 21, a reduced second clearance C2a in the radial direction of the rod 21, and a reduced fourth clearance C4a in the radial direction of the rod 21, respectively.

In the embodiment disclosed here, when the rod 21 is tilted, each of the elastic bodies 51b made of rubber, which is disposed on the right bush 51 (the first bush), deforms. The deformation of the elastic bodies 51b allows the movement of the rod 21 in the radial direction and allows the tilting of the rod 21 at the left bush 52 (the second bush). As a result, a load F1 applied in the radial direction of the rod 21 at the right bush 51 (the first bush) and the other load F2 applied in the radial direction of the rod 21 at the left bush 52 (the second bush) are reduced when the right bush 51 (the first bush) is arranged with the elastic bodies 51b and the left bush 52 (the second bush) is arranged with the inner periphery protrusion 52a. Thus, wearing at the sliding portions of the rod 21, the right bush 51 (the first bush) and the left bush 52 (the second bush) may be reduced compared to when the right bush 51 (the first bush) is arranged without the elastic bodies 51b and the left bush 52 (the second bush) is arranged without the inner periphery protrusion 52a.

In the embodiment disclosed here, each of the right bush 51 (the first bush) and the left bush 52 (the second bush) slidably engages to the outer periphery of the rod 21 and movably supports the rod 21 in the axial direction. Limited clearances in the radial direction of the rod are defined between the rod 21 and each of the right bush 51 (the first bush) and the left bush 52 (the second bush), which in turn prevent the abnormal noise generated due to a clearance.

In the embodiment disclosed here, the spline structure 42 is arranged near to the left bush 52 (the second bush) in a position between the screw structure 41 and the left bush 52 (the second bush). Compared to when the spline structure 42 is arranged further apart from the left bush 52 (the second bush) in the axial direction of the rod 21, a reduction amount of the fourth clearance (i.e. C4-C4a) in the radial direction of the rod 21 at the spline structure 42 may be reduced so that an initial definition of the fourth clearance C4 in the radial direction of the rod 21 may be reduced. As a result, a smooth functioning is acquired at the spline structure 42, and at the same time, wearing of sliding portions at the spline structure 42 (wearing of the spline protrusions 42a, the spline grooves 42b, for example) may be prevented effectively.

According to an aspect of the disclosure, the vehicular rear wheel steering device 100, includes a housing 10 configured to be installed on a vehicle body, the rod 21 being non-turnable with respect to the housing 10 and movably supported in the axial direction of the rod 21, with each of opposite ends 21a, 21b of the rod 21 connected to a rear wheel of a vehicle, the conversion mechanism 40 arranged between the rod 21 and the housing 10 to convert the rotational drive force of the rotational drive device 30 to the drive force in the axial direction of the rod 21, the right bush 51 (the first bush) in tubular form disposed at the first end 10a of the housing 10, and the left bush 52 (the second bush) in tubular form disposed at the second end 10b of the housing 10. The right bush 51 (the first bush) and the left bush 52 (the second bush) are slidably engaged to the outer periphery of the rod 21 and supports the rod 21 in the state to be movable in the axial direction of the rod 21. The rod supporting rigidity of the right bush 51 (the first bush) is determined to be lower compared to the rod supporting rigidity of the left bush 52 (the second bush). The right bush 51 (the first bush) is arranged with the elastic body 51b being resilient and being configured to change shape in a radial direction of the rod 21, and the left bush 52 (the second bush) is arranged with the inner periphery protrusion 52a at which the rod 21 is configured to make the tilting movement.

As a result of the right bush 51 (the first bush) and the left bush 52 (the second bush) slidably engaging to the outer periphery of the rod 21 and supporting the rod 21 in the state to be movable in the axial direction of the rod 21 with the vehicular rear wheel steering device according to this disclosure, the limited clearances in the radial direction of the rod are defined between the rod 21 and each of the right bush 51 (the first bush) and the left bush 52 (the second bush), so that the abnormal noise generated due to the clearance is prevented. With the vehicular rear wheel steering device according to this disclosure, the rod supporting rigidity of the right bush 51 (the first bush) is determined to be lower compared to the rod supporting rigidity of the left bush 52 (the second bush). The right bush 51 (the first bush) is arranged with the elastic body 51b configured to deform in the radial direction of the rod 21, and the left bush 52 (the second bush) is arranged with the inner periphery protrusion 52a at which the rod 21 is configured to make a tilting movement. As a result, when the rotational drive device 30 is actuated and the rod 21 moves in the radial direction of the rod 21 with respect to the housing 10, which is a resultant movement due, for example, to variations of components in the vehicular rear wheel steering device. This movement of the rod 21 at the right bush 51 (the first bush) in the radial direction of the rod 21 is allowed by the deformation of the elastic body 51b, so that the tilting of the rod 21 is allowed at the left bush 52 (the second bush). Thus, the load F1 applied in the radial direction of the rod 21 at the right bush 51 (the first bush) and the other load F2 applied in the radial direction of the rod 21 at the left bush 52 (the second bush) are reduced so that the wearing at the sliding portions of the rod 21, the right bush 51 (the first bush) and the left bush 52 (the second bush) may be reduced compared to when the right bush 51 (the first bush) is arranged without the elastic body 51b and the left bush 52 is arranged without the inner periphery protrusion 52a.

According to the further aspect of the disclosure, the conversion mechanism (40) of the vehicular rear wheel steering device 100 includes the screw structure 41, which is arranged in a middle portion of the rod 21, and is configured with the female thread 41a (the nut thread) and the male thread 41b. The female thread 41a (the nut thread) is installed in the rotatable state with respect to the housing 10 and immovable in the axial direction of the rod 21, and is rotationally driven by the rotational drive device 30. The male thread 41b, which is formed on the rod 21, screws to the female thread 41a (the nut thread). The conversion mechanism 40 also includes the spline structure 42, which is arranged near the left bush 52 (the second bush) in the position between the screw structure 41 and the left bush 52 (the second bush), and is configured with the spline protrusion 42a, which is formed on the rod 21, and the spline groove 42b, which is formed on the housing 10.

Compared to when the spline structure 42 is arranged further apart from the left bush 52 (the second bush) in the axial direction of the rod 21, a reduction amount of the fourth clearance (i.e. C4-C4a) in the radial direction of the rod 21 at the spline structure 42 may be reduced so that an initial definition of the fourth clearance C4 in the radial direction of the rod 21 may be reduced. As a result, a smooth functioning is acquired at the spline structure 42, and at the same time, wearing of sliding portions at the spline structure 42 may be prevented effectively.

According to another aspect of the disclosure, the right bush 51 (the first bush) of the vehicular rear wheel steering device 100 is arranged with the predetermined first clearance C1 defined in the radial direction of the rod 21 between the housing 10 and the right bush 51 (the first bush) when the rear wheel steering device 100 is inactive, and the left bush 52 (the second bush) of the vehicular rear wheel steering device 100 is arranged with the predetermined second clearance C2 defined in the radial direction of the rod 21 between the rod 21 and the left bush 52 (the second bush) at the length from the end portion of the inner periphery protrusion 52a in the right bush 51 (the first bush) side to the end portion of the left bush 52 (the second bush) in the right bush 51 (the first bush) side when the rear wheel steering device 100 is inactive. The predetermined first clearance C1 defined in the radial direction of the rod 21 is larger compared to the predetermined second clearance C2 defined in the radial direction of the rod 21.

Defining the predetermined first clearance C1 defined in the radial direction of the rod 21 to be larger compared to the predetermined second clearance C2 defined in the radial direction of the rod 21 determines the rod supporting rigidity of the right bush 51 (the first bush) to be lower compared to the rod supporting rigidity of the left bush 52 (the second bush). In addition to the advantage of the right bush 51 (the first bush) being arranged with the elastic body 51b which is configured to deform in the radial direction of the rod 21, and the left bush 52 (the second bush) arranged with the inner periphery protrusion 52a at which the rod 21 is configured to make a tilting movement, when the rotational drive device 30 is actuated and the rod 21 moves in the radial direction of the rod 21 with respect to the housing 10, which is the resultant movement due, for example, to variations of components in the vehicular rear wheel steering device, a movement of the rod 21 at the right bush 51 (the first bush) in the radial direction of the rod 21 is allowed by the deformation of the elastic body 51b, so that the tilting of the rod 21 is allowed at the left bush 52 (the second bush). Thus, the load F1 applied in the radial direction of the rod 21 at the right bush 51 (the first bush) and the other load F2 applied in the radial direction of the rod 21 at the left bush 52 (the second bush) are reduced so that the wearing at the sliding portions of the rod 21, the right bush 51 (the first bush) and the left bush 52 (the second bush) may be reduced.

According to the further aspect of the disclosure, the vehicular rear wheel steering device 100 includes the elastic body 51*b* of annular form arranged on an outer periphery of the right bush 51 (the first bush).

The elastic body 51*b* which is disposed on the right bush 51 (the first bush) having the annular form deforms in response to the tilting of the rod 21 in the entire radial direction of the rod 21. The deformation of the elastic body 51*b* allows the movement of the rod 21 in the radial direction and allows the tilting of the rod 21 at the left bush 52 (the second bush). As a result, the load F1 applied in the radial direction of the rod 21 at the right bush 51 (the first bush) and the other load F2 applied in the radial direction of the rod 21 at the left bush 52 (the second bush) are reduced compared to when the right bush 51 (the first bush) is arranged without the elastic body 51*b* and the left bush 52 (the second bush) is arranged without the inner periphery protrusion 52*a*. Thus, wearing at the sliding portions of the rod 21, the right bush 51 (the first bush) and the left bush 52 (the second bush) may be reduced.

According to another aspect of the disclosure, the vehicular rear wheel steering device 100 includes the elastic body 51*b* arranged in a pair disposed in the axial direction of the rod 21 of the right bush 51 (the first bush).

A stability of the elastic bodies 51*b* that are disposed on the right bush 51 (the first bush) in a pair in the axial direction of the rod 21 and configured to deform when the rod 21 is tilted increases compared to when the elastic body 51*b* is singularly disposed. The deformation of the elastic bodies 51*b* allows the movement of the rod 21 in the radial direction and allows the tilting of the rod 21 at the left bush 52 (the second bush). As a result, the load F1 applied in the radial direction of the rod 21 at the right bush 51 (the first bush) and the other load F2 applied in the radial direction of the rod 21 at the left bush 52 (the second bush) are reduced compared to when the right bush 51 (the first bush) is arranged without the elastic body 51*b* and the left bush 52 (the second bush) is arranged without the inner periphery protrusion 52*a*. Thus, wearing at the sliding portions of the rod 21, the right bush 51 (the first bush) and the left bush 52 (the second bush) may be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicular rear wheel steering device, comprising:
a housing configured to be installed on a vehicle body;
a rod being non-turnable with respect to the housing and movably supported in an axial direction of the rod, with each of opposite ends of the rod connected to a rear wheel of a vehicle;
a conversion mechanism arranged between the rod and the housing to convert a rotational drive force of a rotational drive device to a drive force in the axial direction of the rod;
a first bush in tubular form disposed at a first end of the housing;
a second bush in tubular form disposed at a second end of the housing;
the first bush and the second bush being slidably engaged to an outer periphery of the rod and supporting the rod in a state to be movable in the axial direction of the rod;
a rod supporting rigidity of the first bush determined to be lower compared to the rod supporting rigidity of the second bush;
the first bush arranged with an elastic body being resilient and being configured to change shape in a radial direction of the rod; and
the second bush arranged with an inner periphery protrusion at which the rod is configured to make a tilting movement, wherein
the first bush is arranged with a predetermined first clearance defined in the radial direction of the rod between the housing and the first bush when the rear wheel steering device is inactive,
the second bush is arranged with a predetermined second clearance defined in the radial direction of the rod between the rod and the second bush at a length from an end portion of the inner periphery protrusion in the first bush side to an end portion of the second bush in the first bush side when the rear wheel steering device is inactive, and
the predetermined first clearance defined in the radial direction of the rod is larger compared to the predetermined second clearance defined in the radial direction of the rod.

2. The vehicular rear wheel steering device according to claim 1, wherein
the conversion mechanism includes a screw structure, which is arranged in a middle portion of the rod, and is configured with a female thread and a male thread, in which the female thread, which is installed in a rotatable state with respect to the housing and immovable in the axial direction of the rod, is rotationally driven by the rotational drive device, and the male thread, which is formed on the rod, screws to the female thread, and wherein
the conversion mechanism includes a spline structure, which is arranged near the second bush in a position between the screw structure and the second bush, and is configured with a spline protrusion, which is formed on the rod, and a spline groove, which is formed on the housing.

3. The vehicular rear wheel steering device according to claim 2, wherein the elastic body of annular form is arranged on an outer periphery of the first bush.

4. The vehicular rear wheel steering device according to claim 3, wherein the elastic body is arranged in a pair disposed in the axial direction of the rod of the first bush.

5. The vehicular rear wheel steering device according to claim 2, wherein the elastic body is arranged in a pair disposed in the axial direction of the rod of the first bush.

6. The vehicular rear wheel steering device according to claim 1, wherein the elastic body of annular form is arranged on an outer periphery of the first bush.

7. The vehicular rear wheel steering device according to claim 6, wherein the elastic body is arranged in a pair disposed in the axial direction of the rod of the first bush.

8. The vehicular rear wheel steering device according to claim 1, wherein the elastic body is arranged in a pair disposed in the axial direction of the rod of the first bush.

* * * * *